US012809007B2

(12) United States Patent
Spiegel

(10) Patent No.: US 12,809,007 B2
(45) Date of Patent: Nov. 24, 2026

(54) METHOD FOR CLASSIFYING AT LEAST ONE OBJECT ON THE BASIS OF HEIGHT

(71) Applicant: ELMOS Semiconductor SE, Dortmund (DE)

(72) Inventor: Egbert Spiegel, Marl (DE)

(73) Assignee: ELMOS SEMICONDUCTOR SE, Leverkusen (DE)

( * ) Notice: Subject to any disclaimer, the term of this patent is extended or adjusted under 35 U.S.C. 154(b) by 59 days.

(21) Appl. No.: 18/962,419

(22) Filed: Nov. 27, 2024

(65) Prior Publication Data

US 2025/0172390 A1 May 29, 2025

(30) Foreign Application Priority Data

Nov. 28, 2023 (DE) ..................... 10 2023 133 216.3
Nov. 28, 2023 (EP) .................................... 23212650

(51) Int. Cl.

| | |
|---|---|
| ***G01S 7/539*** | (2006.01) |
| *G01B 17/02* | (2006.01) |
| *G01S 15/42* | (2006.01) |
| *G01S 15/52* | (2006.01) |
| *G01S 15/931* | (2020.01) |

(52) U.S. Cl.

CPC .............. *G01S 7/539* (2013.01); *G01B 17/02* (2013.01); *G01S 15/42* (2013.01); *G01S 15/52* (2013.01); *G01S 15/931* (2013.01)

(58) Field of Classification Search

CPC ........ G01S 15/42; G01S 15/52; G01S 15/931; G01S 7/52004; G01S 7/2502; G01S 7/539; G01B 17/02

See application file for complete search history.

(56) References Cited

U.S. PATENT DOCUMENTS

2011/0259106 A1 10/2011 Niemz
2016/0033628 A1* 2/2016 Lee ......................... G01S 15/10 367/98
2017/0294125 A1* 10/2017 Matsuura ................ G01S 7/524

(Continued)

FOREIGN PATENT DOCUMENTS

DE 102009000401 A1 7/2010
DE 102012200308 A1 7/2013

(Continued)

*Primary Examiner* — Van T Trieu

(74) *Attorney, Agent, or Firm* — Michael J. McCandlish; Mindful IP PLLC

(57) ABSTRACT

A method classifies an object on the basis of the height of the object based on an ultrasonic signal. The method comprises: receiving the reflected ultrasonic signal; determining a first total value in a first predefined range around a global maximum of the ultrasonic signal; determining a second total value in a second predefined range preceding the first predefined range; determining a third total value in a third predefined range following the first predefined range; determining a first difference value based on a weighted subtraction operation applied to the third total value and the first total value; determining a second difference value based on a weighted subtraction operation applied to the second total value and the first total value; and classifying the object based on the sign of the first difference value and the second difference value into one of at least two height categories.

20 Claims, 9 Drawing Sheets

(56) References Cited

U.S. PATENT DOCUMENTS

| | | | | |
|---|---|---|---|---|
| 2023/0375702 | A1 | 11/2023 | Jecker | |
| 2024/0061094 | A1* | 2/2024 | Suleiman | G01S 15/42 |
| 2024/0168156 | A1* | 5/2024 | Pampus | G01S 15/52 |
| 2024/0361454 | A1* | 10/2024 | Klus | G01S 15/876 |

FOREIGN PATENT DOCUMENTS

| | | | |
|---|---|---|---|
| DE | 112013004908 | B4 | 6/2015 |
| DE | 102015218537 | A1 | 3/2017 |
| DE | 102016013939 | A1 | 5/2017 |
| DE | 102016113736 | A1 | 2/2018 |
| DE | 102018103414 | A1 | 8/2019 |
| DE | 102018103560 | A1 | 8/2019 |
| DE | 102019128023 | B4 | 4/2021 |
| DE | 102020206001 | A1 | 11/2021 |
| EP | 1764630 | B1 | 3/2007 |
| WO | 2022073706 | A1 | 4/2022 |
| WO | 2023032474 | A1 | 3/2023 |

* cited by examiner

METHOD FOR CLASSIFYING AT LEAST ONE OBJECT ON THE BASIS OF HEIGHT

CROSS-REFERENCE TO RELATED APPLICATION

This application claims priority to European Patent Application number 23212650.8, filed Nov. 28, 2023, and German Patent Application number 10 2023 133 216.3, the entire disclosures of each of which are incorporated herein by reference.

TECHNICAL FIELD

The disclosure relates to a method for classifying at least one object on the basis of the height of the object.

BACKGROUND

The height of objects can be determined by means of an ultrasonic signal, or the objects can be classified according to their height.

In the context of methods for classifying objects on the basis of height by means of reflected ultrasound, the prior art considers a maximum value or a plurality of maximum values of the reflected ultrasonic signal. An object extending upwardly beyond the height position of the ultrasonic transmitter/ultrasonic receiver at least in part is identified on the basis of two local maxima in the ultrasonic signal reflected by the object. However, this identification or classification is unreliable, especially in the case of motor vehicles outdoors.

Another option for classifying objects on the basis of the height of the object by means of reflected ultrasound lies in the classification of the objects using a neural network, i.e., the neural network-based analysis of the ultrasonic signal reflected by the object. However, disadvantageously in this case, the neural network has to be trained on an individual basis, in particular also in a manner dependent on the installation height of the ultrasonic receiver.

SUMMARY

The problem addressed by the present disclosure is that of providing a technically simple and reliable method for classifying at least one object on the basis of height.

This problem is solved by a method as claimed in an independent claim.

The problem can be solved by a method for classifying at least one object on the basis of the height of the object based on the data of an ultrasonic signal reflected by the object, the method comprising the following steps: receiving the data of the reflected ultrasonic signal; determining a first total value, the first total value being the sum of the values of the reflected ultrasonic signal in a first predefined range around a global maximum of the reflected ultrasonic signal or the first total value being the sum of each of the values of the reflected ultrasonic signal raised respectively to a higher power, in a first predefined range around a global maximum of the reflected ultrasonic signal; determining a second total value, the second total value being the sum of the values of the reflected ultrasonic signal in a second predefined range immediately preceding the first predefined range or the second total value being the sum of each of the values of the reflected ultrasonic signal raised respectively to a higher power, in a second predefined range immediately preceding the first predefined range; determining a third total value, the third total value being the sum of the values of the reflected ultrasonic signal in a third predefined range immediately following the first predefined range or the third total value being the sum of each of the values of the reflected ultrasonic signal raised respectively to a higher power, in a third predefined range immediately following the first predefined range; determining a first difference value based on a subtraction operation, in particular a weighted subtraction operation, applied to the third total value and the first total value; determining a second difference value based on a subtraction operation, in particular a weighted subtraction operation, applied to the second total value and the first total value; and classifying the at least one object based on the first difference value and the second difference value, in particular based on the sign of the first difference value and the second difference value, into one of at least two height categories.

An advantage thereof is that the method is technically simple or implementable with limited technical resources. In particular, this means that only little computational outlay is required for implementing the method. Hence, the method can be implemented using cost-effective hardware. Moreover, the method or the classification is very reliable. Moreover, the method operates independently of the installation height or position height of the ultrasonic transmitter/ultrasonic receiver, i.e., the method need not be specifically adapted to the height of the ultrasonic transmitter/ultrasonic receiver.

The problem can be solved by a computer program product comprising instructions which are readable by a processor of a computer and which, when executed by the processor, prompt the processor to carry out the above-described method. The problem can also be solved by a computer-readable medium on which such a computer program is stored.

The aforementioned problem can also be solved by an evaluation device.

The problem can be solved by an evaluation device for evaluating an ultrasonic signal reflected by an object, the evaluation device being designed—to receive the data of the reflected ultrasonic signal, —to determine a first total value, the first total value being the sum of the values of the reflected ultrasonic signal in a first predefined range around a global maximum of the reflected ultrasonic signal or the first total value being the sum of each of the values of the reflected ultrasonic signal raised respectively to a higher power, in a first predefined range around a global maximum of the reflected ultrasonic signal, —to determine a second total value, the second total value being the sum of the values of the reflected ultrasonic signal in a second predefined range immediately preceding the first predefined range or the second total value being the sum of each of the values of the reflected ultrasonic signal raised respectively to a higher power, in a second predefined range immediately preceding the first predefined range, —to determine a third total value, the third total value being the sum of the values of the reflected ultrasonic signal in a third predefined range immediately following the first predefined range or the third total value being the sum of each of the values of the reflected ultrasonic signal raised respectively to a higher power, in a third predefined range immediately following the first predefined range, —to determine a first difference value based on a subtraction operation, in particular a weighted subtraction operation, applied to the third total value and the first total value, —to determine a second difference value based on a subtraction operation, in particular a weighted subtraction operation, applied to the second total value and the first total value, and —to classify the at least one object based on the first difference value and the second difference value, in particular based on the sign of the first difference value and the second difference value, into one of at least two height categories.

An advantage thereof is that the evaluation device can have a technically simple and cost-effective embodiment. The evaluation device can require only limited computational capacities. Moreover, the evaluation device can implement the classification reliably and appropriately. A further advantage lies in the fact that the evaluation device need not be specifically adapted to the installation height of the ultrasonic transmitter/ultrasonic receiver.

The aforementioned problem is solved by a system comprising an above-described evaluation device, an ultrasonic transmitter for transmitting the ultrasonic signal in the direction of an object, and an ultrasonic receiver for receiving the ultrasonic signal reflected by the object and for transmitting the data of the reflected ultrasonic signal to the evaluation device.

The aforementioned problem is also solved by a motor vehicle having the above-described system.

According to an embodiment of the method, the third total value is multiplied by a predefined factor during the determination of the first difference value, and/or the second total value is multiplied by a predefined factor during the determination of the second difference value. An advantage thereof is that this allows the classification to be set precisely. This means that the predefined factor can be used to determine when an object is classified or categorized in a first category (e.g., high object) and when the same object is classified or categorized in a different second category (e.g., low object).

According to an embodiment of the method, the at least one object is classified as an object located substantially completely below the height of an ultrasonic receiver of the reflected ultrasonic signal if both the first difference value and the second difference value have a negative sign. As a result, objects situated substantially completely below the height position of an ultrasonic receiver of the reflected ultrasonic signal are classified as such in a technically simple and reliable manner. Moreover, the objects are reliably and appropriately classified hereby.

According to an embodiment of the method, the at least one object is classified as an object located at least partially above a height of an ultrasonic receiver of the reflected ultrasonic signal if the first difference value has a positive sign or the second difference value has a positive sign. An advantage thereof is that objects situated at least partially above the height position of an ultrasonic receiver of the reflected ultrasonic signal (e.g., a wall or the like), can be sorted into the appropriate category or class, or can be classified as such, in a technically simple and reliable manner. Moreover, the classification of such objects is particularly reliable as a result thereof.

According to an embodiment of the method, the at least one object is classified as an object having a plurality of reflective surfaces if the first difference value has a positive sign and the second difference value has a positive sign. Even objects having a plurality of different surfaces that reflect the ultrasonic signal are reliably classified in a separate category in this way. This allows so-called complex objects, i.e., objects with a multiplicity of different reflective surfaces, to be classified as such in a reliable and technically simple manner.

According to an embodiment of the method, additional sensor information, optionally visual sensor information, about the object is taken into account during the step of classifying the object. Whether or not the object has a height greater than a predefined height can be reliably determined in this way, especially in the case of objects which have a plurality of reflection surfaces for the ultrasonic signal. In the case of e.g., motor vehicles, this allows determination as to whether or not the motor vehicle can drive (without significant expected damage) over the object. For example, the additional sensor information may originate from a camera, a lidar apparatus or the like. A recognition unit can combine the additional information and the classification by means of the ultrasound signal and can make a decision with regard to the height of the object.

According to an embodiment of the method, the ultrasonic signal comprises or is a linear ultrasonic signal with, optionally constantly, increasing or decreasing frequency. An advantage thereof is that the local maxima of the reflected ultrasonic signal are separated from one another particularly clearly. In this way, the classification can be implemented even more reliably.

According to an embodiment of the method, a probability characteristic specifying the reliability of the implemented classification of the at least one object is furthermore determined based on the total values. An advantage thereof is that the method not only implements a classification of the height of the object but also outputs the reliability of this classification as a probability characteristic. Consequently, an assessment can be made as to how clear or unambiguous the decision was in respect of the classification.

According to an embodiment of the method, the at least one object is classified as an object almost extending to the height of an ultrasonic receiver of the reflected ultrasonic signal if the sign of the first difference value is negative and the sign of the second difference value is positive. An advantage thereof is that objects that extend to just below the height of the ultrasonic receiver can be clearly or unambiguously distinguished from other objects whose upper end is significantly below the height position of the ultrasonic receiver and objects whose upper end is significantly above the height position of the ultrasonic receiver.

According to an embodiment of the method, the method further comprises the following steps: determining a fourth total value, the fourth total value being the sum of the values of the reflected ultrasonic signal in a fourth predefined range around a local maximum of the reflected ultrasonic signal or the fourth total value being the sum of each of the values of the reflected ultrasonic signal raised respectively to a higher power, in a fourth predefined range around a local maximum of the reflected ultrasonic signal, the fourth predefined range following to the first predefined range; determining a fifth total value, the fifth total value being the sum of the values of the reflected ultrasonic signal in a fifth predefined range immediately preceding the fourth predefined range or the fifth total value being the sum of each of the values of the reflected ultrasonic signal raised respectively to a higher power, in a fifth predefined range immediately preceding the fourth predefined range; determining a sixth total value, the sixth total value being the sum of the values of the reflected ultrasonic signal in a sixth predefined range immediately following the fourth predefined range or the sixth total value being the sum of each of the values of the reflected ultrasonic signal raised respectively to a higher power, in a sixth predefined range immediately following the fourth predefined range; determining a third difference value based on a subtraction operation, in particular a weighted subtraction operation, applied to the sixth total value and the fourth total value; determining a fourth difference value based on a subtraction operation, in particular a weighted subtraction operation, applied to the fifth total value and the fourth total value; wherein the step of classifying the at least one object into one of at least two height categories is implemented based on the first difference value, the second difference value, the third difference value and the fourth difference value. An advantage thereof is that a plurality of objects can be classified independently of one another or that complex objects with a plurality of reflection surfaces can be reliably classified as such. An advantage thereof is that complex objects, i.e., objects with a plurality of reflection surfaces, can be classified reliably.

"Classifying the height of at least one object" can be understood to mean that there is a determination as to whether the height of an object belongs to a first category or a second category (or optionally further categories) of height. This means that the height of the objects is not, or need not be, determined absolutely or precisely; instead, all that is, or needs to be, determined is whether the height of the object is located above or below a first threshold value (and optionally above or below further threshold values). For example, all that needs to be determined in the case of two classification categories is whether the height of the object is greater than a threshold value or less than the threshold value, which separates the two categories from one another.

"Height of the object" can be understood to mean the relative height with regard to the ultrasonic transmitter/ultrasonic receiver or the height position thereof. This means that there is no determination of, or no need to determine, an absolute height (above the ground or the like); instead, the height of the object can be determined relative to the height of the ultrasonic transmitter/ultrasonic receiver. However, it is conceivable that "height of the object" is understood to mean the absolute height of the object above the ground.

"The sum of the values of the reflected ultrasonic signal in a first predefined range around a global maximum of the reflected ultrasonic signal" can be understood to mean the area under the reflected ultrasonic signal in the aforementioned range. Alternatively, it is possible to calculate the sum of the squares of the values of the signal of the reflected ultrasonic signal in the aforementioned range, with the sum of the squares of the measured values corresponding to the energy of the reflected ultrasonic signal in this range. The "range around the global maximum" can extend symmetrically or asymmetrically, in part in a first direction (e.g., in respect of the time of flight of the signal) from the maximum and in part in a second direction (e.g., in respect of the time of flight of the signal) from the maximum opposite to the first side. As it were, a certain portion in front of the maximum and behind the maximum is added to the position of the maximum in order to form the first predefined range.

The ultrasonic signal can be transmitted by an ultrasonic receiver-ultrasonic transmitter system, and this can be used to receive the reflected ultrasonic signal. Hence, the ultrasonic transmitter can act as ultrasonic receiver at the same time, or the ultrasonic transmitter can also receive reflected ultrasound.

"On the basis of the height of the object" can be understood to mean that it is determined whether the object extends upwardly to a position situated below the position of the ultrasonic receiver-ultrasonic transmitter system transmitting and receiving the ultrasonic signal or whether the object extends to a position situated above the position of the ultrasonic receiver-ultrasonic transmitter system. Thus, "on the basis of the height of the object" can be, in particular, the relative height in relation to the height position of the ultrasonic receiver-ultrasonic transmitter system transmitting and receiving the ultrasonic signal.

"Height" can be understood to mean the position of the uppermost point of a surface of an object or of the object, i.e., a point of the object situated furthest away from e.g., the ground or the road.

"A second predefined range immediately preceding the first predefined range" can be understood to mean a range containing reflected ultrasound from an object or part of an object, the reflection surfaces of which are closer to the ultrasonic transmitter/ultrasonic receiver than reflection surfaces of an object whose reflected ultrasound is located in the first predefined range. Reflected ultrasound originating from objects or reflection surfaces situated closer to the ultrasonic transmitter/ultrasonic receiver than objects or reflection surfaces situated further away has a shorter time of flight and is therefore situated in a second range (temporally) preceding the first predefined range containing the global maximum.

"A third predefined range immediately following the first predefined range" can be understood to mean a range containing reflected ultrasound received from objects or reflection surfaces of objects situated further away from the ultrasonic transmitter/ultrasonic receiver than objects or reflection surfaces of objects whose reflected ultrasound is in the first predefined range containing the global maximum. Therefore, the ultrasound in the third predefined range has a longer time of flight, and the third range immediately follows the first range in time. This means that the reflected ultrasound in the third range is received later than the reflected ultrasound in the first predefined range.

The term "preceding" can be understood to mean that a range contains signals or measured values of the reflected ultrasonic signal which had a shorter time of flight than signals in a "following" range. Thus, signals or measured values from a preceding range originate from reflection surfaces closer to the ultrasonic receiver, and signals or measured values from a following range originate from reflection surfaces further away from the ultrasonic receiver.

Examples will become apparent from the dependent claims. The disclosure is explained in more detail below with reference to drawings of exemplary examples.

DESCRIPTION

Figure 1:
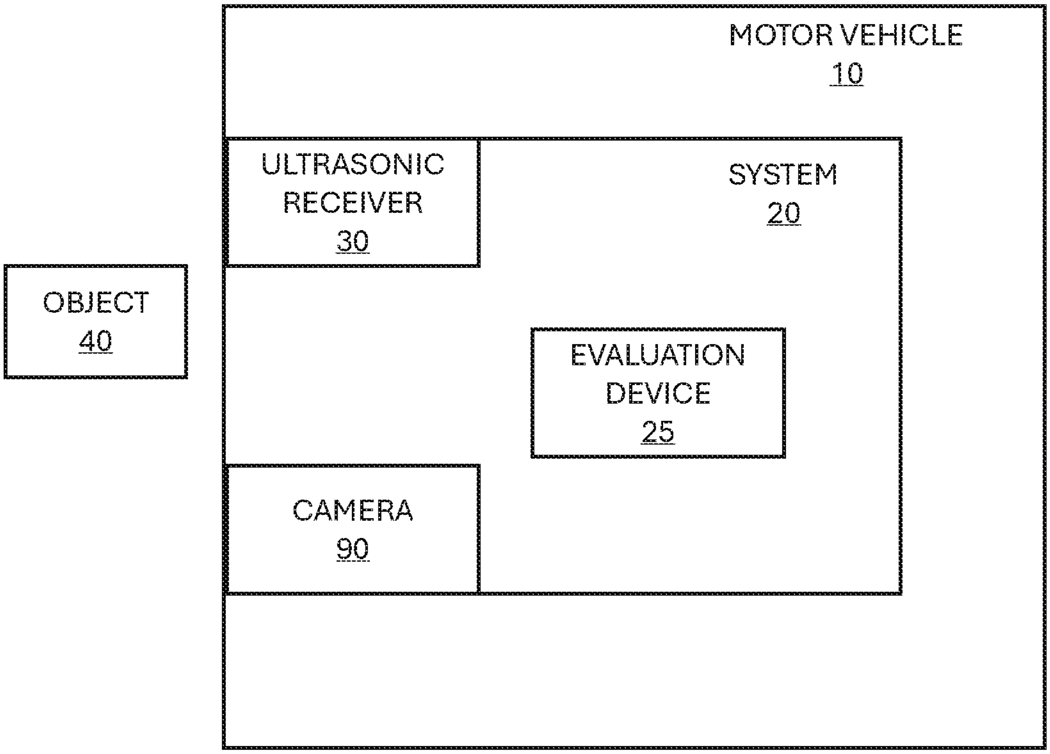
FIG. 1 shows a schematic view of an exemplary first example of the motor vehicle according to the disclosure.

The following description uses the same reference numerals for identical and functionally identical parts.

FIG. 1 shows a schematic view of an exemplary first example of the motor vehicle 10 according to the disclosure.

The motor vehicle 10 comprises a system 20 which in turn has an ultrasonic transmitter for transmitting an ultrasonic signal 35 and an ultrasonic receiver 30 for receiving the reflected ultrasonic signal 37 and for transmitting the data to an evaluation device 25. The ultrasonic transmitter can act as ultrasonic receiver 30.

Moreover, the motor vehicle 10 or system 20 comprises the evaluation device 25 for evaluating the reflected ultrasonic signal 37, which was received by the ultrasonic receiver 30 and the data of which were transmitted to the evaluation device 25.

The system 20 can be a parking assist or warning assist for a motor vehicle 10.

The method set forth below is implemented in the motor vehicle 10 or in the system 20.

Initially, an ultrasonic signal 35 is transmitted or radiated by the ultrasonic transmitter. The ultrasonic signal 35 can be a linear chirp signal, i.e., a linear ultrasonic signal with constantly increasing frequency (chirp up) or a linear ultrasonic signal with constantly decreasing frequency (chirp down).

The ultrasonic signal 35 is reflected by surfaces of the object 40 and/or by the ground 45, and the reflected ultrasonic signal 37 is received by the ultrasonic receiver 30. The received reflected ultrasonic signal 37 or the data from the reflected received ultrasonic signal 37 are transmitted to the evaluation device 25 by the ultrasonic receiver 30 and are evaluated by the evaluation device 25. The evaluation device 25 implements a classification or categorization of the at least one object 40 into at least two different categories on the basis of or based on height.

The method classifies the object 40 or the objects (e.g., objects situated around the vehicle) on the basis of or based on or according to their height. According to their determined height, the objects 40 are at least classified into one of two categories: 1. The object 40 is a high object, i.e., the height of the object 40 extends (significantly) beyond the height at which the ultrasonic transmitter/ultrasonic receiver 30 is arranged. 2. The object 40 is a non-high object, i.e. the object 40 does not extend to the height at which the ultrasonic transmitter/ultrasonic receiver 30 is arranged.

For this classification, the reflected ultrasonic signal 37 (echo) or the data thereof are analyzed or evaluated.

Figure 2:
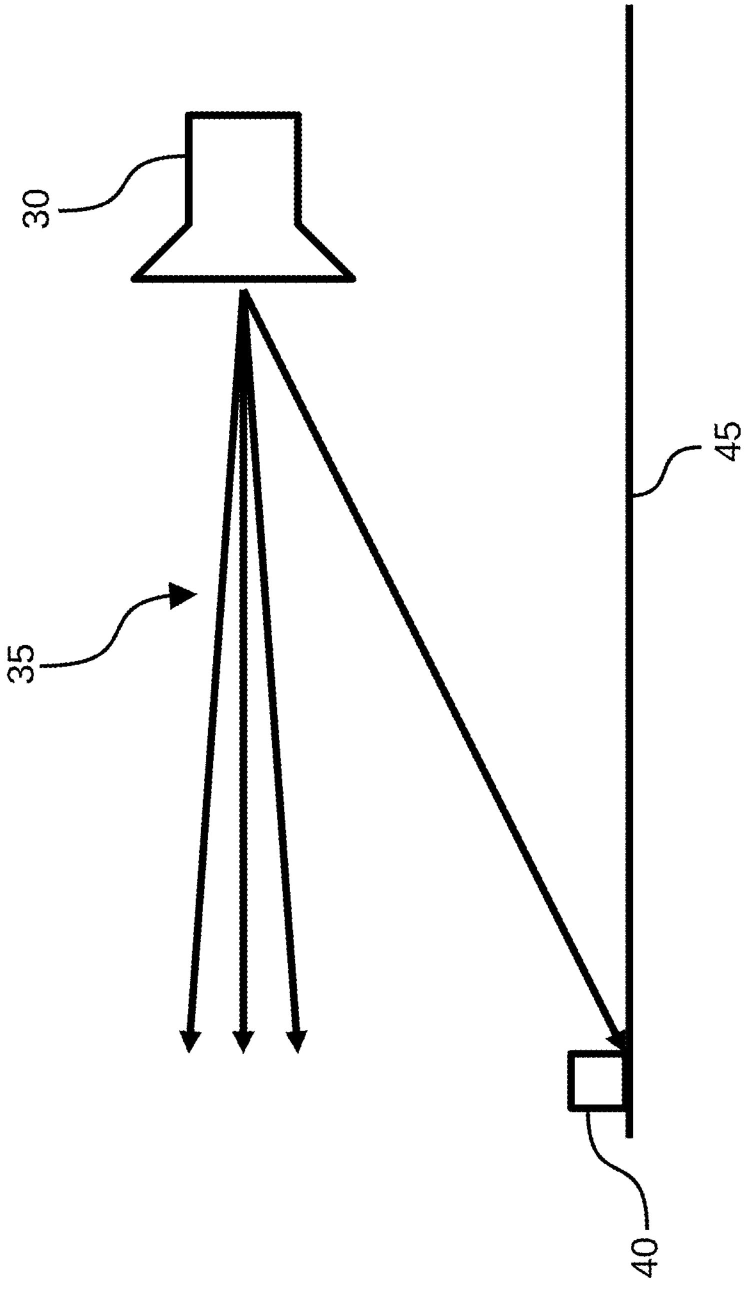
FIG. 2 shows a schematic view of the transmitted ultrasonic signal in the case of a non-high or low object.
Figure 3:
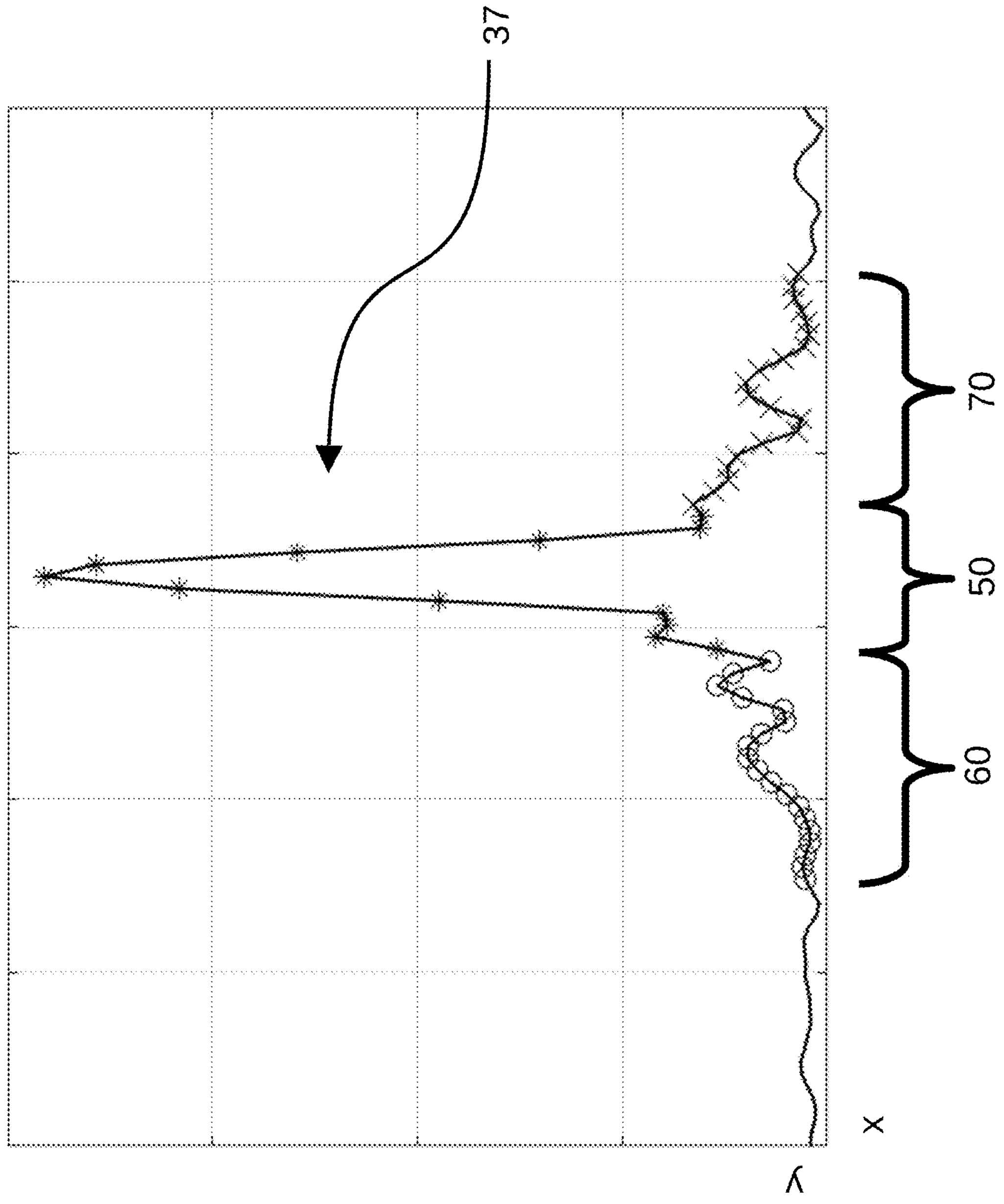
FIG. 3 shows a schematic representation of the reflected ultrasonic signal in the case of the object shown in FIG. 2.

FIG. 2 shows a schematic view of the ultrasonic signal 35 in the case of a non-high or low object. FIG. 3 shows a schematic representation of the reflected ultrasonic signal 37 in the case of the object 40 shown in FIG. 2.

For example, the object 40 in FIG. 2 can be a curb, a flat edge, e.g. a garage access, or the like. The ultrasonic transmitter/ultrasonic receiver 30 is situated significantly above the upper edge of the object 40, i.e., the height position of the ultrasonic transmitter/ultrasonic receiver 30 is located significantly above the upper edge of the object 40. For example, the low object 40 is approx. 10 cm high, while the ultrasonic transmitter/ultrasonic receiver 30 is arranged at a height of approx. 50 cm or approx. 80 cm above the ground 45.

In FIG. 2, the height of the object 40 extends from the bottom to the top.

In FIG. 3, the time curve or distance of the respective reflection surface from the ultrasonic transmitter/ultrasonic receiver 30 is plotted along the x-axis, and the strength of the signal or the respective measured value is plotted on the y-axis.

In the method, the values of the reflected ultrasonic signal 37 are added within a predefined range 50 around the global maximum. This means that the area under the curve of the reflected ultrasonic signal 37 is determined or calculated around the global maximum. This sum or the area is the first total value. Alternatively, the first total value can be formed by virtue of summing a power (e.g., the square) of the measured values in the range 50 around the local maximum or global maximum. The sum of the squares of the measured values corresponds to the energy in this first range 50.

In FIG. 3, this first range 50 or the measured values within the first range 50 are labeled by asterisks as measurement points. In FIG. 3, the first range 50 comprises twelve measured values.

A second range 60 is arranged immediately in front of the first range 50 (hence immediately adjacent to the first range 50). The second total value is formed by adding the measured values in this second range 60. This corresponds to the area below the curve of the measured values in this second range 60. Alternatively, the squares of the measured values in the second range 60 can be added in order to form the second total value. In FIG. 3, the measured values in the second range 60 are labeled by circles. In FIG. 3, the second range 60 comprises nineteen measured values.

A third range 70 is arranged immediately behind the first range 50 (and hence immediately adjacent to the first range 50). The third total value is formed by adding the measured values in the third range 70. This corresponds to the area below the curve of the measured values in the third range 70. Alternatively, the squares of the measured values in the third range 70 can be added in order to form the third total value. In FIG. 3, the measured values in the third predefined range 70 are labeled by crosses. In FIG. 3, the third range 70 has twenty measured values.

The first range 50 can be arranged symmetrically around the maximum. This means that the global maximum is the center of the first range 50. However, it is also conceivable that the first range 50 is arranged asymmetrically around the maximum.

For example, the first range 50 can comprise the maximum value and the five measured values immediately preceding the maximum value and the five measured values immediately following the maximum value in time.

The widths of the first range 50, of the second range 60 and of the third range 70 can be equal in size. For example, the width can in each case be 1.5-times or twice that of the first range 50. However, it is conceivable that the first range 50 is half the size of the second range 60 and half the size of the third range 70. Likewise, the second range 60 and the third range 70 can each be three times the size of the first range 50.

The width of the various ranges 50, 60, 70 can be defined empirically.

The three total values are now related to one another. Subsequently, these are compared to a threshold value.

A first difference value is formed by virtue of the third total value being multiplied by a first predefined factor and the first total value being subtracted therefrom:

$$\text{first difference value} = \text{first predefined factor} * \text{third total value} - \text{first total value}$$

The first predefined factor co-determines when the first difference value has a positive sign and when the first difference value has a negative sign. Consequently, this can be used to define the threshold or threshold value for when an object 40 is classified as high, as mid-high or as low or non-high.

A second difference value is formed by virtue of the second total value being multiplied by a second predefined factor and the first total value being subtracted therefrom:

$$\text{second difference value} = \text{second predefined factor} * \text{second total value} - \text{first total value}$$

The second predefined factor can be the same as the first predefined factor. It is conceivable that the two factors differ.

The first predefined factor and the second predefined factor are set or selected in such a way that the signs of the first difference value and of the second difference value arise as set forth below for the respective objects.

The first predefined factor and the second predefined factor can e.g., be located in the range from approx. 3 to approx. 4, especially if the sums themselves are added.

Should the powers of the measured values, e.g., the squares thereof, be added, the first predefined factor and the second predefined factor can be located in the range from approx. 12 to 20, e.g., at 16.

Now, the classification is implemented depending on the sign of the first difference value and the sign of the second difference value.

If the first difference value has a negative sign and the second difference value has a negative sign, then the object 40 is classified as a low or short or non-high object.

Should the first difference value have a positive sign, or the second difference value have a positive sign, the object 40 is classified as a high object. The "or" can be an "exclusive or".

Should the first difference value have a positive sign and the second difference value have a positive sign, the object 40 is classified as a complex object. A complex object has a plurality of reflection surfaces and consequently does not have a simple or geometrically simple structure.

FIG. 2 shows a low object 40 (e.g., a curb), i.e., an object 40 whose upper end is situated (significantly) below the ultrasonic transmitter/ultrasonic receiver 30. It is evident from FIG. 3 shows that the echo or the reflected ultrasonic signal 37 substantially consists of a main signal or peak or one echo signal which is situated substantially completely within the first range 50 around the global maximum. It follows that the signs of the first difference value and of the second difference value are negative, and the object 40 is classified as a low or short or non-high object.

Figure 4:
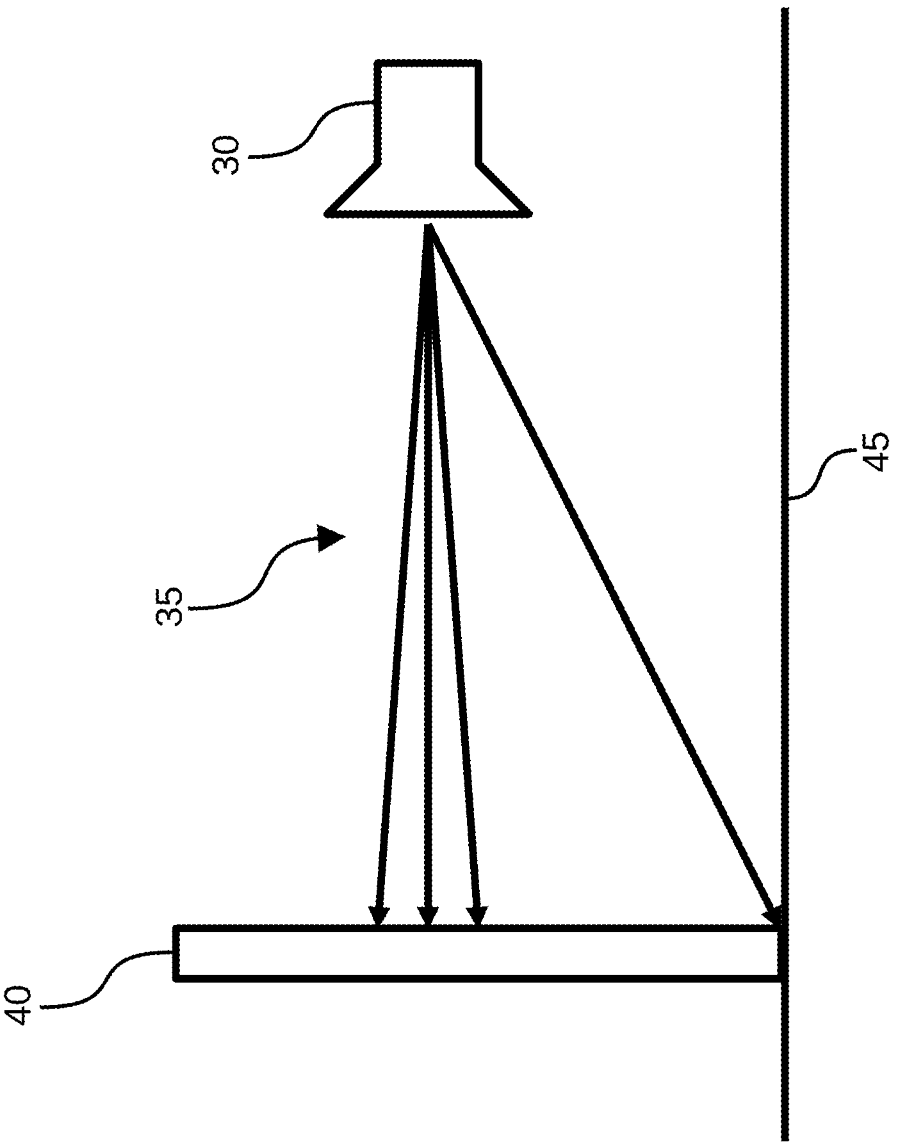
FIG. 4 shows a schematic view of the ultrasonic signal in the case of a high object.
Figure 5:
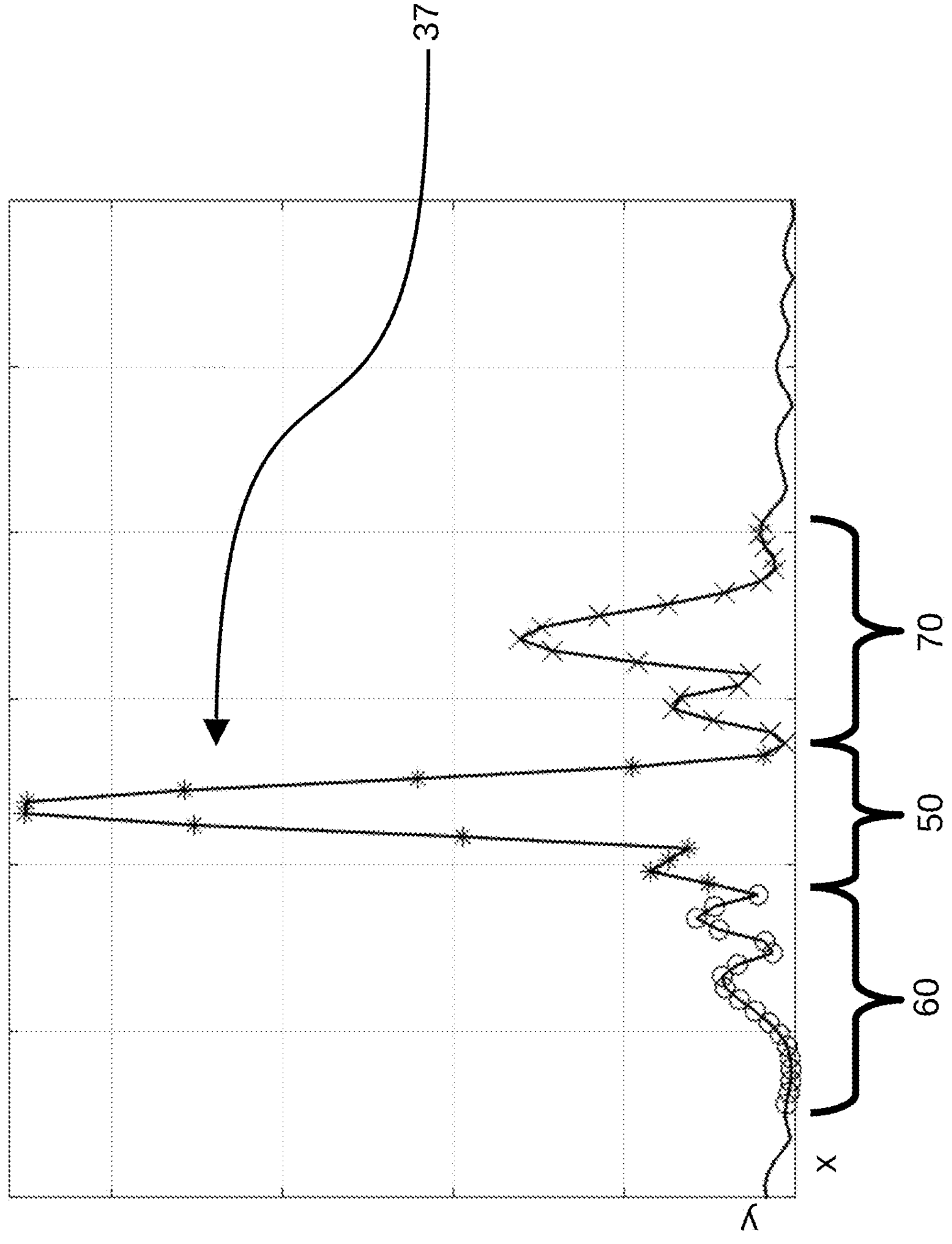
FIG. 5 shows a schematic representation of the reflected ultrasonic signal in the case of the object shown in FIG. 4.

FIG. 4 shows a schematic view of the ultrasonic signal 35 in the case of a high object. FIG. 5 shows a schematic representation of the reflected ultrasonic signal 37 in the case of the object 40 shown in FIG. 4.

The object 40 extends significantly above the height at which the ultrasonic transmitter/ultrasonic receiver 30 is arranged. The object 40 can be e.g., a house wall, a tube, or a pipe.

The reflected ultrasonic signal 37 or the echo has a high direct maximum/echo and, following this in time, a smaller signal or local maximum or echo due to the corner reflector object 40/ground 45.

In this case, the first difference value has a positive sign, or the second difference value has a positive sign.

Figure 6:
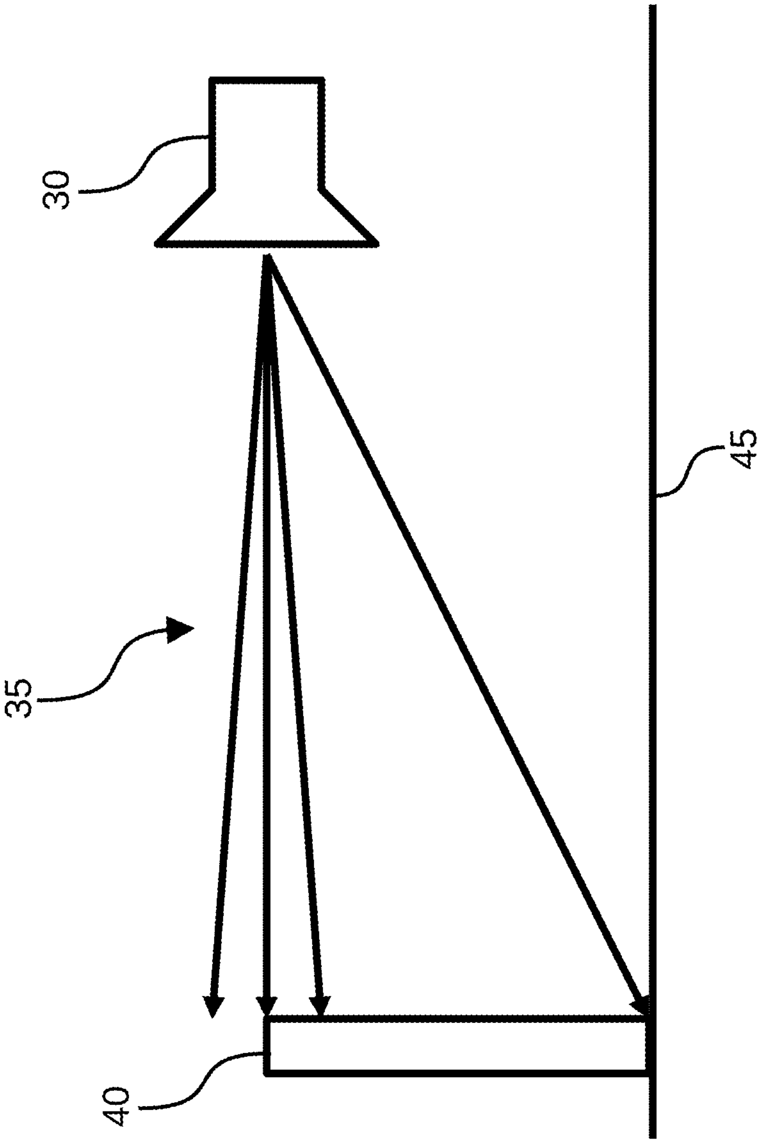
FIG. 6 shows a schematic view of the ultrasonic signal in the case of a mid-high object.

FIG. 6 shows a schematic view of the ultrasonic signal 35 in the case of a mid-high object.

Figure 7:
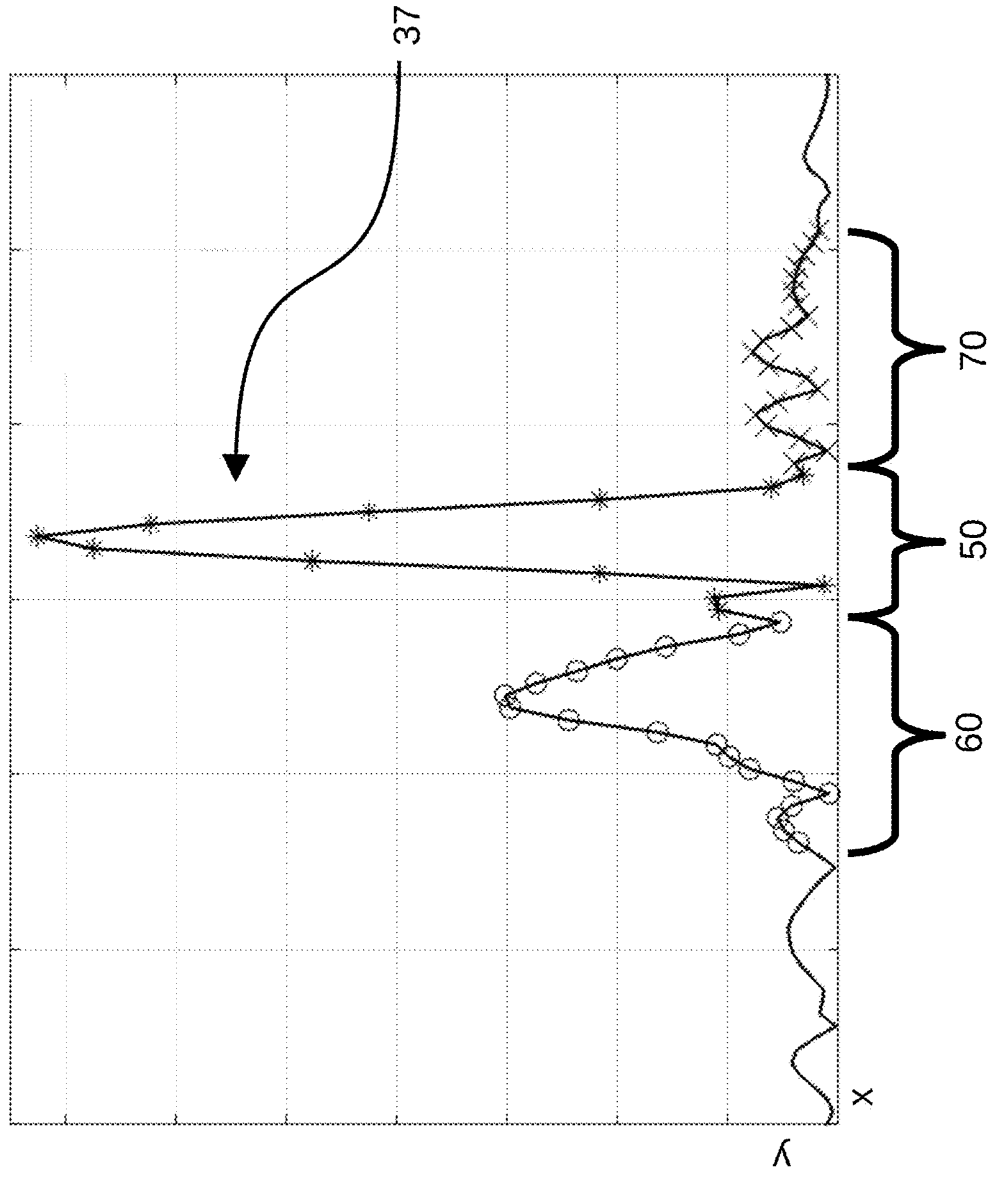
FIG. 7 shows a schematic representation of the reflected ultrasonic signal in the case of the object shown in FIG. 6.

FIG. 7 shows a schematic representation of the reflected ultrasonic signal 37 in the case of the object 40 shown in FIG. 6.

The mid-high object extends to just below the height at which the ultrasonic transmitter/ultrasonic receiver 30 is situated. In this case, the main sonic lobe of the transmitted ultrasonic signal 35 grazes the upper edge of the object 40, leading to a small but clear echo or local maximum which (temporally) precedes the absolute maximum.

In this way, objects that extend slightly or just below the height of the ultrasonic transmitter/ultrasonic receiver 30 (e.g., up to approx. 10 cm below the height) can be classified in a separate category.

In this case, the second difference value has a negative sign, and the first difference value has a positive sign.

Figure 8:
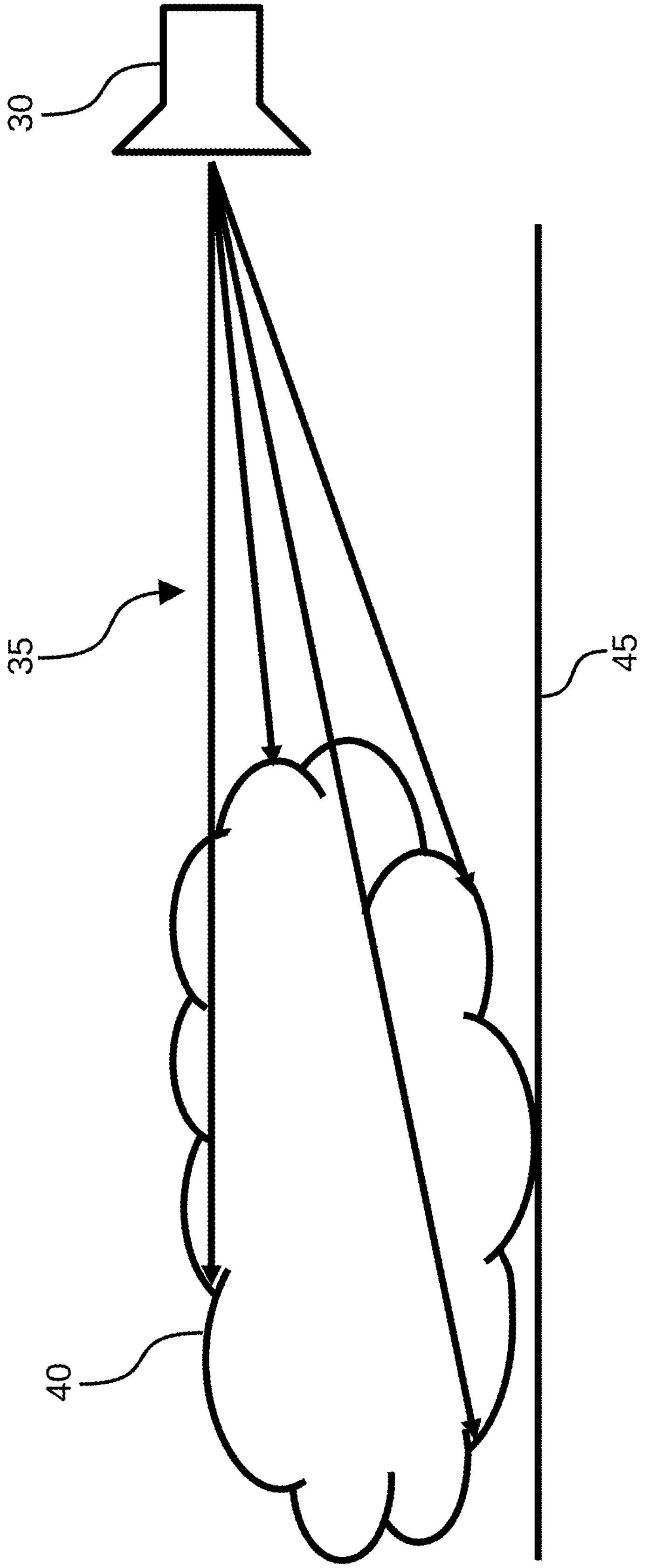
FIG. 8 shows a schematic view of the ultrasonic signal in the case of a complex object.

FIG. 8 shows a schematic view of the ultrasonic signal 35 in the case of a complex object.

Figure 9:
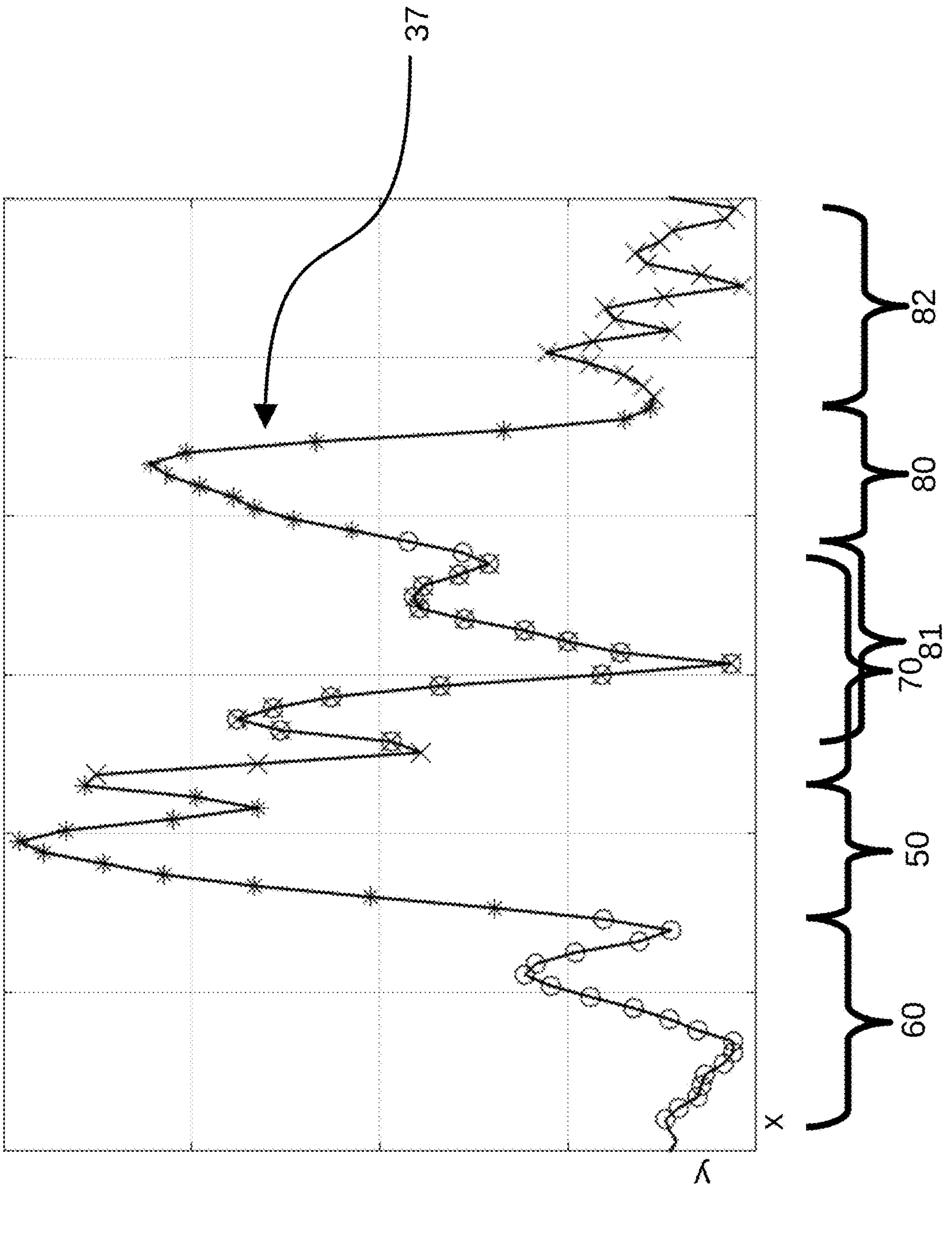
FIG. 9 shows a schematic representation of the reflected ultrasonic signal in the case of the object shown in FIG. 8.

FIG. 9 shows a schematic representation of the reflected ultrasonic signal 37 in the case of the object 40 shown in FIG. 8.

A complex object comprises a plurality of reflection surfaces (at different distances) for the ultrasonic signal 35. FIG. 8 shows a bush, but the complex object can also be a front or tail of a vehicle (e.g. of an automobile or a motor bike), a human, an animal or the like.

There is an absolute maximum of the signal in the case of the complex object. The first difference value has a negative sign, and the second difference value has a negative sign. The first range 50 is arranged around the absolute maximum of the signal. Moreover, there are very pronounced local maxima which are almost as high as the absolute maximum even though they are located outside of the first range 50, the second range 60 and the third range 70. The maxima can change continually outdoors or in the open air.

A fourth range 80 is arranged around the right local maximum (third-highest value overall). A sixth range 82 is arranged immediately following the fourth range 80, and a fifth range 81 is arranged immediately preceding the fourth range 80.

The fourth range 80, the fifth range 81 and the sixth range 82 are used to form a fourth, fifth and sixth total value, in a manner corresponding to the formation of the first, second and third total value. This means: the fourth total value is formed by adding the measured values in the fourth range 80; the fifth total value is formed by adding the measured values in the fifth range 81; the sixth total value is formed by adding the measured values in the sixth range 82.

Subsequently, a third difference value and a fourth difference value are formed, in a manner corresponding to the formation of the first difference value and the second difference value:

$$\text{third difference value} = \text{predefined factor} * \text{sixth total value} - \text{fourth total value}$$

$$\text{fourth difference value} = \text{predefined factor} * \text{fifth total value} - \text{fourth total value}$$

Subsequently, a classification of the object 40 is implemented depending on the signs of the third difference value and of the fourth difference value, wherein the same rules with regard to the combination of signs as for the first difference value and the second difference value might apply to the classification.

That is to say the signal is divided into two portions so to speak, and the respective global maximum is determined in these two portions. Then the difference values for these two portions become independent of one another. The two portions can overlap one another.

As it were, the global maximum value or the global maximum is reset to zero following the third range 70 or to the right of the third range 70, and a global maximum is determined again.

The assumption is made that a complex object, i.e. an object with different reflection surfaces for the ultrasonic transmitter/ultrasonic receiver 30, is present if the sign of the first difference value or of the second difference value is positive in the first portion, this being an exclusive or in particular, and if the sign of the third difference value or of the fourth difference value is positive, this being an exclusive or in particular.

The result of the classification of the object 40 can be output to a human and/or to a data interface.

There is a partial overlap between the third range 70 and the fifth range 81 in FIG. 9; the measurement points are labeled using a circle and a cross in this range 70, 81.

It is possible that the method described in the context of FIGS. 2-7 is carried out twice. The ranges (along the x-axis) in which the method described in the context of FIGS. 2-7 is carried out can overlap in this case. For example, the third range 70 overlaps the fifth range 81 in FIG. 9. This means that the complex object has such a broad extent or the reflection surfaces have such different distances from the ultrasonic transmitter/ultrasonic receiver 30 that the method is carried out twice, wherein two different absolute maxima (in two different portions along the x-axis) are assumed when running through or carrying out the method described in the context of FIGS. 2-7 twice.

A probability characteristic can be determined or output in the method. The probability characteristic P specifies how reliably or how surely the object 40 was appropriately classified in the respective category. The probability characteristic can be a number between 0 and 1. It is possible that the probability characteristic is determined by a sigmoid function:

$$P = \text{sigmoid}\left(\beta * \left(\left(\alpha * 1st \text{ difference value}/2nd \text{ difference value}\right) - 1\right)\right)$$

where

α is the factor used to multiply the first total value and/or third total value when forming the respective difference value, and β is a predefined number such that the value P is between 0 and 1.

The ultrasonic signal 35 can be an ultrasonic signal with increasing frequency.

The motor vehicle 10 can further comprise a camera 90, e.g., a rearview camera. The classification of the evaluation device 25 can be combined with the data or image from the camera 90 and an overarching recognition unit can implement a reliable recognition of the height of objects using the classification and the camera data. In particular, the recognition unit can determine whether or not the motor vehicle 10 can drive over the object 40 without being damaged. Should the motor vehicle 10 not be able to drive over the object without damage being expected, the recognition unit can output a warning signal and/or brake the motor vehicle 10.

LIST OF REFERENCE SYMBOLS

10 Motor vehicle
20 System
25 Evaluation device
30 Ultrasonic transmitter/ultrasonic receiver
35 Transmitted ultrasonic signal
37 Reflected ultrasonic signal
40 Object
45 Ground
50 First range
60 Second range
70 Third range
80 Fourth range
81 Fifth range
82 Sixth range
90 Camera

What is claimed is:

1. A method for classifying at least one object based on a height of the at least one object determined based on data of a reflected ultrasonic signal reflected by the at least one object, the method comprising:

receiving the data of the reflected ultrasonic signal;

determining a first total value, the first total value being one of: (i) a sum of values of the reflected ultrasonic signal in a first predefined range around a global maximum of the reflected ultrasonic signal, or (ii) a sum of each of the values of the reflected ultrasonic signal raised respectively to a higher power, in the first predefined range around the global maximum of the reflected ultrasonic signal;

determining a second total value, the second total value being: (i) the sum of the values of the reflected ultrasonic signal in a second predefined range immediately preceding the first predefined range, or (ii) the sum of each of the values of the reflected ultrasonic signal raised respectively to a higher power, in the second predefined range immediately preceding the first predefined range;

determining a third total value, the third total value being: (i) the sum of the values of the reflected ultrasonic signal in a third predefined range immediately following the first predefined range, or (ii) the sum of each of the values of the reflected ultrasonic signal raised respectively to a higher power, in the third predefined range immediately following the first predefined range;

determining a first difference value based on a first subtraction operation applied to the third total value and the first total value;

determining a second difference value based on a second subtraction operation applied to the second total value and the first total value; and classifying the at least one object into one of at least two height categories based on the first difference value and the second difference value.

2. The method of claim 1, wherein the third total value is multiplied by a predefined factor during the determination of the first difference value, and/or the second total value is multiplied by a predefined factor during the determination of the second difference value.

3. The method of claim 1, wherein the at least one object is classified as an object located completely below a height of an ultrasonic receiver of the reflected ultrasonic signal upon determining that the first difference value and the second difference value have a negative sign.

4. The method of claim 1, wherein the at least one object is classified as an object located at least partially above a height of an ultrasonic receiver of the reflected ultrasonic signal upon determining that the first difference value has a positive sign, or the second difference value has a positive sign.

5. The method of claim 1, wherein the at least one object is classified as an object having a plurality of reflective surfaces upon determining that the first difference value has a positive sign, and the second difference value has a positive sign.

6. The method of claim 1, wherein classifying the at least one object is further based on other sensor data, including visual sensor information, about the at least one object.

7. The method of claim 1, wherein the reflected ultrasonic signal includes a linear ultrasonic signal with an increasing or decreasing frequency.

8. The method of claim 1, wherein a probability characteristic specifying a reliability of the classifying of the at least one object is determined based on one or more of the first total value, the second total value, or the third total value.

9. The method of claim 1, wherein the at least one object is classified as an object extending to just below a height of an ultrasonic receiver of the reflected ultrasonic signal upon determining that the sign of the first difference value is negative and the sign of the second difference value is positive.

10. The method of claim 1, further comprising:

determining a fourth total value, the fourth total value being: (i) the sum of the values of the reflected ultrasonic signal in a fourth predefined range around a local maximum of the reflected ultrasonic signal, or (ii) the sum of each of the values of the reflected ultrasonic signal raised respectively to a higher power, in the fourth predefined range around a local maximum of the reflected ultrasonic signal, the fourth predefined range following to the first predefined range;

determining a fifth total value, the fifth total value being: (i) the sum of the values of the reflected ultrasonic signal in a fifth predefined range immediately preceding the fourth predefined range, or (ii) the fifth total value being the sum of each of the values of the reflected ultrasonic signal raised respectively to a higher power, in a fifth predefined range immediately preceding the fourth predefined range;

determining a sixth total value, the sixth total value being: (i) the sum of the values of the reflected ultrasonic signal in a sixth predefined range immediately following the fourth predefined range, or (ii) the sixth total value being the sum of each of the values of the reflected ultrasonic signal raised respectively to a higher power, in the sixth predefined range immediately following the fourth predefined range;

determining a third difference value based on a third subtraction operation applied to the sixth total value and the fourth total value;

determining a fourth difference value based on a fourth subtraction operation applied to the fifth total value and the fourth total value;

wherein the classifying the at least one object into the one of at least two height categories is based on the first difference value, the second difference value, the third difference value and the fourth difference value.

11. A computer program product comprising instructions which are readable by a processor of a computer and which, when executed by the processor, prompt the processor to carry out the method as claimed in claim 1.

12. A computer-readable medium on which the computer program product as claimed in claim 11 is stored.

13. An evaluation device for evaluating a reflected ultrasonic signal reflected by at least an object, the evaluation device being configured to:

receive data of the reflected ultrasonic signal, determine a first total value, the first total value being: (i) a sum of the values of the reflected ultrasonic signal in a first predefined range around a global maximum of the reflected ultrasonic signal, or (ii) a sum of each of the values of the reflected ultrasonic signal raised respectively to a higher power, in a first predefined range around a global maximum of the reflected ultrasonic signal, determine a second total value, the second total value being: (i) the sum of the values of the reflected ultrasonic signal in a second predefined range immediately preceding the first predefined range, or (ii) the sum of each of the values of the reflected ultrasonic signal raised respectively to a higher power, in a second predefined range immediately preceding the first predefined range, determine a third total value, the third total value being: (i) the sum of the values of the reflected ultrasonic signal in a third predefined range immediately following the first predefined range, or (ii) the sum of each of the values of the reflected ultrasonic signal raised respectively to a higher power, in a third predefined range immediately following the first predefined range, determine a first difference value based on a first subtraction operation applied to the third total value and the first total value, determine a second difference value based on a second subtraction operation applied to the second total value and the first total value, and classify the at least one object based on the first difference value and the second difference value into one of at least two height categories.

14. A system, comprising:

an evaluation device as claimed in claim 13, an ultrasonic transmitter for transmitting an ultrasonic signal in a direction of at least an object, and an ultrasonic receiver for receiving the ultrasonic signal reflected by the object and for transmitting the data of the reflected ultrasonic signal to the evaluation device.

15. A motor vehicle comprising a system as claimed in claim 14.

16. The method of claim 1, wherein classifying the at least one object into one of at least two height categories is based on a sign of the first difference value and a sign of the second difference value.

17. The method of claim 1, wherein one or both of the first subtraction operation and the second subtraction operation is a weighted subtraction operation.

18. The method of claim 10, wherein one or both of the third subtraction operation and the fourth subtraction operation is a weighted subtraction operation.

19. The evaluation device of claim 13, wherein classifying the at least one object into one of at least two height categories is based on a sign of the first difference value and a sign of the second difference value.

20. The evaluation device of claim 13, wherein one or both of the first subtraction operation and the second subtraction operation is a weighted subtraction operation.

* * * * *